United States Patent [19]
Schwendemann et al.

[11] Patent Number: 5,594,312
[45] Date of Patent: Jan. 14, 1997

[54] APPARATUS HAVING AN AUTOMATIC FIRING ARRANGEMENT

[75] Inventors: Eckhard Schwendemann, Bühl-Vimbuch; Klaus Bott, Durmersheim, both of Germany

[73] Assignee: Landis & Gyr Technology Innovation AG, Zug, Switzerland

[21] Appl. No.: 395,921

[22] Filed: Feb. 28, 1995

[30]     Foreign Application Priority Data

Mar. 14, 1994 [CH] Switzerland ................. 747/94

[51] Int. Cl.⁶ .................................................. H02P 1/24
[52] U.S. Cl. ............................... 318/799; 318/798
[58] Field of Search ................................. 318/700–826,
318/254, 138; 361/1–12; 363/51, 58, 79,
54, 483, 81; 236/49, 14; 165/22, 122; 122/448 R

[56]             References Cited

U.S. PATENT DOCUMENTS

| | | | |
|---|---|---|---|
| 3,824,437 | 7/1974 | Blaschke | 318/227 |
| 4,074,174 | 2/1978 | Kuge | 318/197 |
| 4,134,049 | 1/1979 | Gray . | |
| 4,353,023 | 10/1982 | Kawada et al. | 318/762 |
| 4,604,563 | 8/1986 | Min | 318/786 |
| 4,716,858 | 1/1988 | Bartels | 122/448 R |
| 4,732,318 | 3/1988 | Osheroff | 236/49 |
| 4,857,814 | 8/1989 | Duncan . | |
| 5,151,642 | 9/1992 | Lombardi et al. | 318/779 |
| 5,153,489 | 10/1992 | Unsworth et al. | 318/490 |
| 5,206,572 | 4/1993 | Farag et al. | 318/778 |
| 5,272,427 | 12/1993 | Nold et al. | 318/672 |
| 5,276,392 | 1/1994 | Beckerman . | |
| 5,510,687 | 4/1996 | Ursworth et al. | 318/727 |

FOREIGN PATENT DOCUMENTS

3830164A1  3/1990  Germany .
2161693    7/1984  United Kingdom .

*Primary Examiner*—Paul Ip
*Attorney, Agent, or Firm*—Meltzer, Lippe, Goldstein et al.

[57]              ABSTRACT

An automatic firing arrangement (1) has an apparatus for actuating a fan which is driven by a controllable-speed asynchronous motor (2). The apparatus includes a frequency converter (3) with which the speed of rotation of the asynchronous motor (2) is controllable, switching devices (6.1; 6.2; 6.3) by which the asynchronous motor (2) can be temporarily separated from the power supply for a predetermined period of time, and a measuring means (5) with which the speed of rotation and the direction of rotation of the asynchronous motor (2) can be detected by way of the generator action thereof in said period of time.

8 Claims, 2 Drawing Sheets

APPARATUS HAVING AN AUTOMATIC FIRING ARRANGEMENT

BACKGROUND OF THE INVENTION

1. Field of the Invention

The invention concerns an apparatus having an automatic firing arrangement.

Such apparatuses are suitable for example for controlling combustion in high-output heat generating installations which are operated with liquid or gaseous fuels.

2. Description of the Prior Art

Automatic firing arrangements which are used in such apparatuses are known for example from the Landis & Gyr company publication "Feuerungsautomaten für Öl und Gasbrenner", L..,. An air fan, a fuel pump (for example an oil pump), a fuel valve and an ignition device are controlled by means of an automatic firing arrangement of that kind. That assembly can control and monitor both the procedure for starting up a burner and also operation thereof subsequently to such a start-up procedure.

In the known apparatuses an approximately constant flow of air is produced by means of an air fan, and the flow of air is influenced by means of an air flap disposed at an upstream or downstream position, in such a way that the desired flow of air to the burner is produced. For safety reasons, the apparatus uses air pressure monitors which, on the basis of the increased pressure which is linked to the flow of air, establish whether a given minimum amount of air is flowing therepast. Regulation of the amount of air which is fed to the burner, by means of the air flap, is difficult because its characteristic is severely non-linear precisely in the low-load range. In a modern oil or gas burner therefore the speed of rotation of the fan motor must be controllable over a wide range.

An apparatus having an automatic firing arrangement as is described in the European patent application EP 614048 is suitable for use in relation to burners of low to medium output. In such burners, the fan drive employed is a controllable-speed DC-motor with integrated electronic control system and integrated sensor for detecting the speed of rotation, wherein provided on the motor beside the voltage supply connection are a control and a feedback signal connection for the reference value and the actual value respectively of the speed of rotation.

The drive for the air fan in high-output burners is generally an asynchronous motor which for example is operated over three phases in an electrical star circuit directly from the mains. As only slight air pressure differences are formed in the low-load mode of operation at a low speed of rotation of the fan drive, because of the low air through-put, it is scarcely possible to adjust air pressure monitors in such a way that they provide a reliable and fail-safe response at a low-load condition. In addition the statically operating air pressure monitors cannot be tested for correct operation when the burner is operating in the continuous mode.

The speed of rotation of the fan drive can be detected for example by means of Hall sensors. Such a design suffers from the disadvantage that magnetic markings have to be disposed on the motor shaft or on the fan impeller. The use of external sensors and transmission of the sensor signals to the automatic firing arrangement also requires a separate feedback signal line.

The speed of rotation of a motor can also be detected by means of tachogenerators, in which case the drive shaft must also be extended out of the motor on the side which is opposite to the fan impeller. Such motors are generally only obtainable as a special design and are correspondingly expensive. In addition the output signal of a tachogenerator contains no information about the direction of rotation.

SUMMARY OF THE INVENTION

An object of the present invention is that of providing an apparatus which provides for reliable and fail-safe detection of the amount of air supplied to the combustion chamber of a fan burner by a fan which is driven by an asynchronous motor, both in a low-load mode and also in continuous operation.

In accordance with the invention there is provided apparatus having an automatic firing arrangement for actuating a fan of said apparatus which fan is driven by a controllable-speed motor, wherein the automatic firing arrangement has a programmer for controlling and monitoring a start-up procedure and continuous operation of a fan burner, characterised in that the controllable-speed motor is an asynchronous motor, and the apparatus includes a frequency converter for controlling the speed of rotation of the asynchronous motor, switching devices for temporarily separating the asynchronous motor from the power supply for a predetermined period of time, and measuring means for detecting the speed of rotation and the direction of rotation of the asynchronous motor by way of the generator action thereof in said period of time.

BRIEF DESCRIPTION OF THE DRAWINGS

Illustrative embodiments of the invention are described in greater detail hereinafter with reference to the drawings in which.

DESCRIPTION OF THE PREFERRED EMBODIMENT

Figure 1:
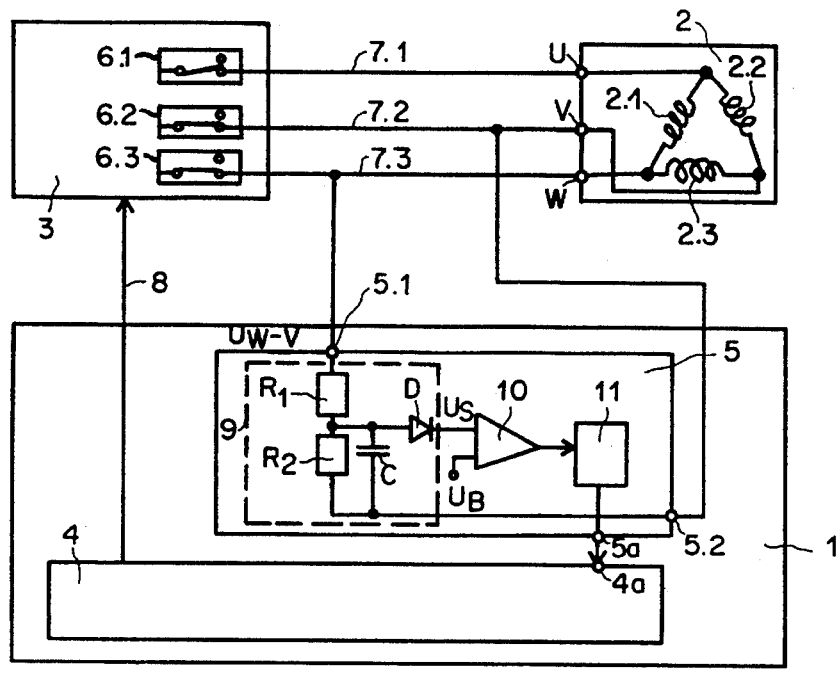
FIG. 1 shows an apparatus having an automatic firing arrangement.

FIG. 1 shows an apparatus having an automatic firing arrangement 1 for actuating a fan for the supply of air to the combustion chamber, the fan belonging to the apparatus. The fan is driven by a controllable-speed asynchronous motor 2, the automatic firing arrangement 1 having a programmer 4 which controls and monitors a start-up procedure and continuous operation of a fan burner. In addition, for actuating the asynchronous motor 2, the apparatus has a frequency converter 3 which is fed at the input side from a three-phase network with 3×230 V. However, it can also be supplied with power from a single-phase network with 1×230 V or from a DC network with 1×325 V or with another feed which is conventional in the industry. The output side of the frequency converter 3 has three switching devices 6.1, 6.2 and 6.3 which are connected by way of lines 7.1, 7.2 and 7.3 to terminals U, V and W of the asynchronous motor 2, and the frequency converter 3 is connected to the programmer 4 by way of a control line 8. To detect the speed of rotation of the asynchronous motor 2 the automatic firing arrangement 1 has a measuring means 5 having two inputs 5.1 and 5.2 which are connected to the terminals W and V respectively of the asynchronous motor 2, and an output 5a which is connected to an input 4a of the programmer 4.

The asynchronous motor 2 has three phase windings 2.1, 2.2 and 2.3 which are connected in a delta configuration. It can however also be connected in a star configuration. The asynchronous motor 2 drives a fan with which the combustion chamber of a fan burner is supplied with a flow of air whose strength depends inter alia on the speed of rotation of the asynchronous motor 2. The programmer 4 presets the desired speed of rotation for the frequency converter 3, as the reference or target speed of rotation. If the asynchronous motor 2 is separated from the power supply, it acts as a generator, until it comes to a halt. In that situation, voltages are generated in the phase windings 2.1 through 2.3, due to the Faraday effect, and those voltages are detected by means of the measuring means 5 and converted into rectangular pulses.

For that purpose the measuring means 5 includes a coupling member 9 formed from two resistors $R_1$ and $R_2$, a capacitor C and a diode D, a comparator circuit 10 and an optocoupler 11. The resistors $R_1$ and $R_2$ are connected in series between the two inputs 5.1 and 5.2. The capacitor C is arranged in parallel with the resistor $R_2$. The anode of the diode D is connected to a tapping between the resistors $R_1$ and $R_2$, while its cathode is connected to a first input of the comparator circuit 10. A reference voltage $U_B$ which is fixed relative to the potential at the input 5.2 is applied to a second input of the comparator circuit 10. The output of the comparator circuit 10 drives the optocoupler 11 whose output is connected to the output 5a so that the measuring element 5 and the programmer 4 are galvanically separated. The coupling member 9 serves for level adaptation of the voltage $U_{W\_v}$ to the processed voltage level of the comparator circuit 10, for half-wave rectification and for filtering out high-frequency components. The comparator circuit 10 is so set that its output carries a high potential and accordingly the optocoupler 11 at the output 5a also carries a high potential when the signal voltage $U_S$ at the first input is greater than the reference voltage $U_B$ at the second input. The output of the comparator circuit 10 and the output 5a carry a low potential if the signal voltage $U_S$ is less than the reference voltage $U_B$. The reference voltage $U_B$ is so determined that the voltage pulses generated in the generator mode of operation of the asynchronous motor 2 in the phase winding 2.3 appear at the input 4a of the programmer 4 as a sequence of rectangular pulses. The information relating to the speed of rotation of the asynchronous motor 2 is present in multiple form, namely in the frequency of those pulses, in the duration of the individual pulses and also in the length of the spaces between the pulses. The programmer 4 is programmed to determine the speed of rotation from the frequency or from the duration of the pulses.

An interrogation cycle for detecting the actual speed of rotation of the asynchronous motor 2 therefore provides that the programmer 4 temporarily opens the switching devices 6.1 through 6.3 for a predetermined period of time T and calculates the actual speed of rotation from the pulses which appear at the output 5a of the measuring means 5.

The speed of rotation of the asynchronous motor 2 decreases as the length of the period of time for which it is separated from the power supply increases. The programmer 4 therefore advantageously checks whether the length of the pulses or the durations between the pulses actually increases with an increasing period of opening of the switching devices 6.1 through 6.3. If that is not the case, there is a fault condition, in response to which the programmer 4 switches off the burner. The fault condition could be that the switching devices 6.1 through 6.3 do not open or that the measuring means 5 is defective. In addition, it is possible prior to the burner actually being set in operation to carry out a measuring cycle in which the reduction in the speed of rotation of the asynchronous motor 2 at different speeds of rotation is measured and stored in a table. In continuous operation therefore the programmer 4 can compare the reduction in the speed of rotation to the values stored in the table.

The speed of rotation of the asynchronous motor 2 can be detected with the described apparatus, without involving separate sensors. Commercially available asynchronous motors can be used, of the simplest design and without modifications. In the low-load mode of operation, there is no need on the one hand for the difficult operation of setting air pressure monitors, while on the other hand the amount of air conveyed can be regulated in such a way as to save energy. Further advantages are achieved by virtue of the fact that, in continuous operation of the burner, it is possible at any time to carry out a test to ascertain whether the fan drive is rotating at a given speed of rotation, and that at the same time a fault condition in respect of the switching devices 6.1 through 6.3 or the measuring means 5 can be detected.

Such an apparatus is also suitable for monitoring the speed of rotation of further asynchronous motors which are present in a burner and which for example drive an air feed fan or a flue gas recirculation fan.

Figure 2:
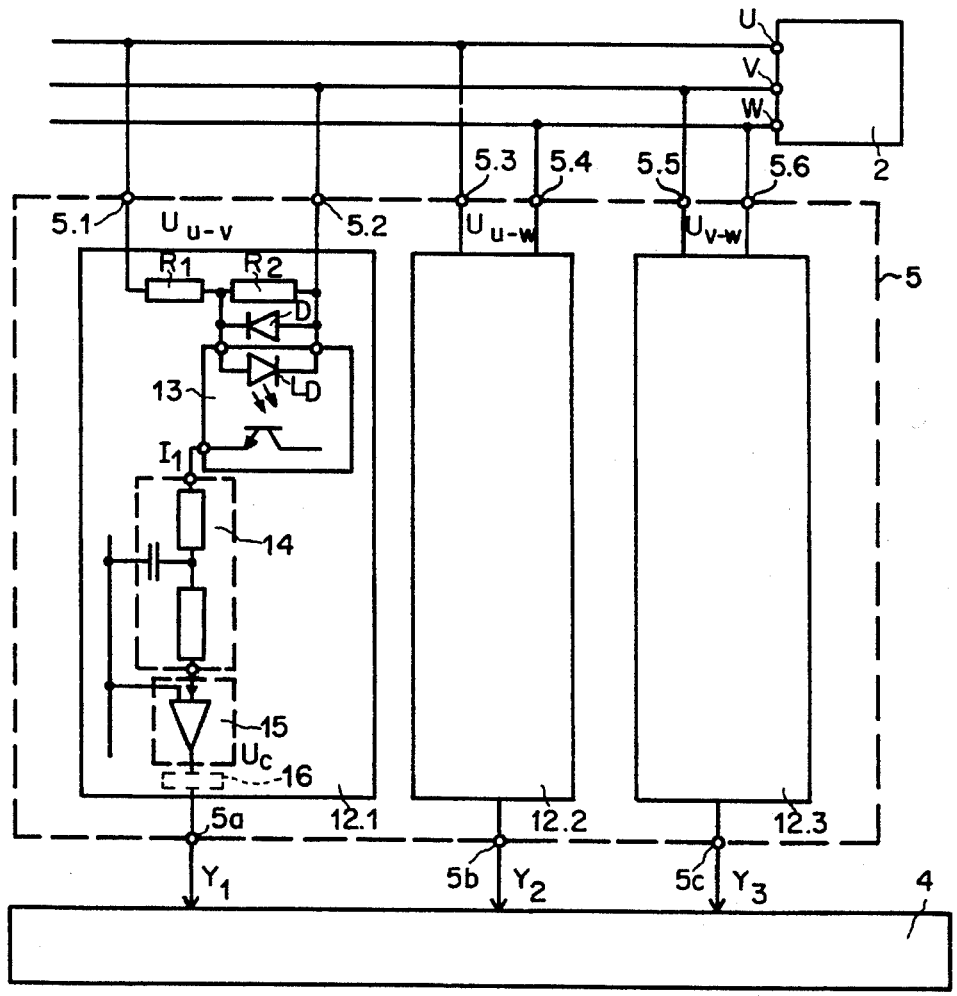
FIG. 2 shows a further embodiment of part of an apparatus having an automatic firing arrangement.

FIG. 2 shows a measuring means 5 and the wiring thereof to the asynchronous motor 2, which, besides detection of the speed of rotation, also makes it possible to ascertain the direction of rotation of the asynchronous motor 2. The measuring means 5 has six inputs 5.1 through 5.6, three outputs 5a, 5b and 5c and three measuring units 12.1 through 12.3, wherein two inputs and an output are associated with each respective measuring unit. The inputs 5.1 and 5.3 are connected to the terminal U of the asynchronous motor 2, the inputs 5.2 and 5.5 are connected to the terminal V and the inputs 5.4 and 5.6 are connected to the terminal W, so that, by means of the three measuring units 12.1 through 12.3, the voltage differences between each two respective terminals U, V and W respectively can be processed to give signals $y_1$, $y_2$ and $y_3$ respectively which can be easily interpreted by the programmer 4. The measuring units 12.1 through 12.3 are of the same design configuration, for which reason the structure and mode of operation thereof are described hereinafter with reference to the measuring unit 12.1.

The two inputs 5.1 and 5.2 of the measuring circuit 12.1 are connected in an input circuit by way of two series-connected resistors $R_1$ and $R_2$. Arranged in parallel with the one resistor $R_2$ are a diode D and an optocoupler 13 with a light-emitting diode LD, in such a way that the diode D is connected in anti-parallel relationship with the light-emitting diode LD. The diodes D and LD limit the voltage drop across the resistor $R_2$ to the value of their forward voltages. In the resistor $R_1$ the voltage difference $U_{U\_v}$ between the terminals U and V, which voltage difference is reduced by the corresponding forward voltage of the diodes D and LD respectively, is converted into a current which is proportional thereto and transposed by way of the optocoupler 13 into a half-wave-rectified output current $I_1$ which is proportional thereto. The output current $I_1$ is fed by means of a coupling member 14 which for example comprises a low pass filter and a resistor disposed on the output side thereof, to a comparator 15 for conversion of the analog current signal $I_1$ into an output signal $y_1$ in the form of a sequence of rectangular pulses with TTL-levels. The measuring units 12.2 and 12.3 process corresponding voltage differences $U_{U\_w}$ and $U_{V\_w}$ respectively.

The direction of rotation of the asynchronous motor 2 can be determined from the sequence in respect of time with which the rectangular pulses of the output signals $y_1$, $y_2$ and $y_3$ of the three measuring units 12.1, 12.2 and 12.3 respectively arrive at the programmer 4. The asynchronous motor 2 rotates in the counterclockwise direction if, after the occurrence of a rectangular pulse in respect of the output signal $y_1$, a next respective rectangular pulse in respect of the output signal $y_2$ occurs before a next rectangular pulse in respect of the output signal $y_3$. The asynchronous motor 2 rotates in the clockwise direction if, after the occurrence of a rectangular pulse in respect of the output signal $y_1$, a respective next rectangular pulse in respect of the output signal $y_3$ occurs before a next rectangular pulse in respect of the output signal $y_2$.

Figure 3:
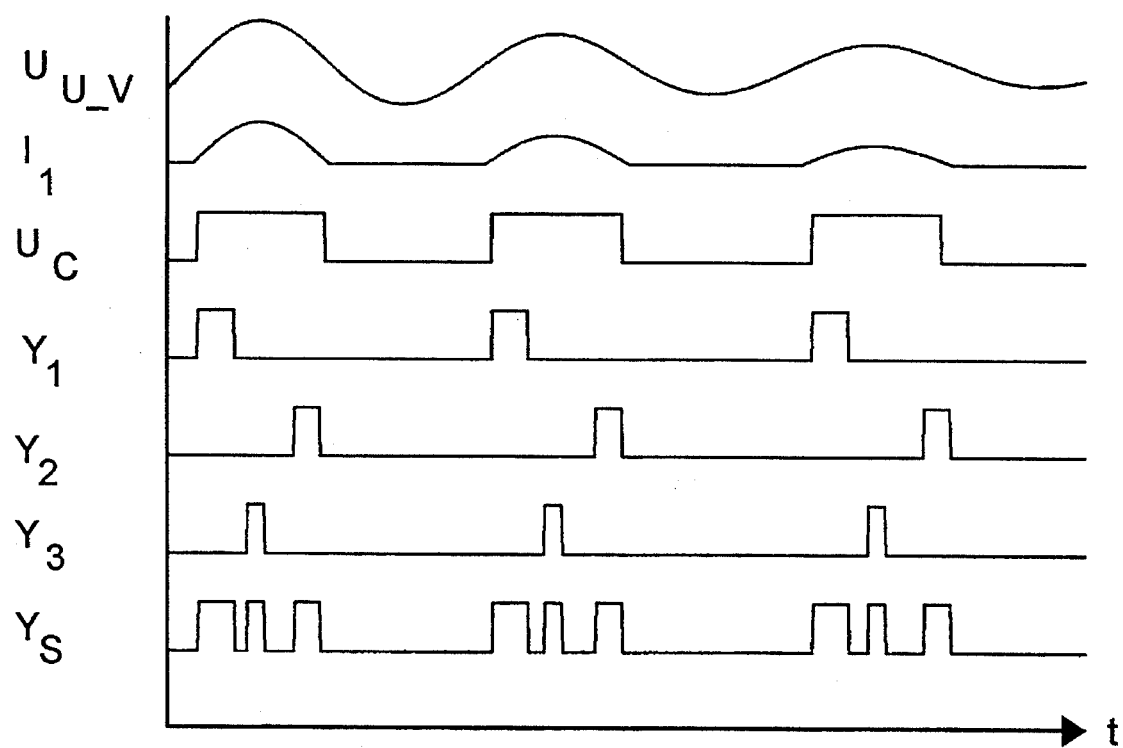
FIG. 3 shows voltage diagrams for illustrating the operation of the apparatus.

In a further development, disposed on the output side of the comparator 15 is a monostable, single-edge-triggered trigger circuit 16 which, upon a change in the comparator output from a low to a high TTL-level, switches into the astable condition and, after a given period of time $T_1$ switches back into the stable condition so that a rectangular pulse of predetermined duration occurs at its output as a signal $y_1$. Such a circuit can be constructed with the component SN 74121 from the known series 74xx. The period $T_1$, $T_2$ and $T_3$ respectively is set to be of different lengths in the three monostable circuits of the measuring units 12.1 through 12.3 so that the rectangular pulses of the three output signals $y_1$, $y_2$ and $y_3$ firstly do not overlap in respect of time even at a high speed of rotation of the asynchronous motor 2 and secondly are of different lengths so that they can be linked by means of a circuit element such as for example a simple OR-circuit to give a signal $y_S$. The signal $y_S$ then has rectangular pulses of different lengths. The direction of rotation of the asynchronous motor 2 can be determined from the signal $y_S$, from whether a sequence of three successive rectangular pulses is long-medium-short or long-short-medium, in which respect the sequence is possibly to be set to one of the two options, by cyclic interchanges. The instantaneous speed of rotation is determined from the spacing in respect of time between the beginnings of each two successive rectangular pulses. With this circuit, to ascertain the speed of rotation and the direction of rotation of the asynchronous motor 2, it is only necessary to have a single connection for transmission of the sum signal $y_S$ between the measuring means 5 and the programmer 4. The comparators 15 serve to detect the current pulses which appear at the output of the associated optocouplers 13 while the trigger circuits establish the length in respect of time of the rectangular pulses which occur at the outputs $y_1$, $y_2$ and $y_3$ respectively. In order clearly to show the situation, FIG. 3 illustrates the input voltage $U_{U\_V}$ at the input of the measuring unit 12.1, the current $I_1$, the signal $U_C$ downstream of the comparator 15, the signal downstream of the monostable, single-edge-triggered trigger circuit $y_1$, the signals $y_2$ and $y_3$ downstream of the trigger circuits of the other two measuring units 12.2 and 12.3 respectively and the sum signal $y_S$ when the asynchronous motor 2 is rotating in the counterclockwise direction. The input voltage $U_{U\_V}$ is shown in the form of an oscillation, the cycle duration of which increases and the amplitude of which decreases with increasing period of time since the opening of the switching devices 6.1 through 6.3. The initial amplitude depends on the speed of rotation of the asynchronous motor 2 while the deceleration thereof is inter alia a function of the applied load. Evaluation of the sum signal $y_S$ is a simple operation as the duration of the individual rectangular pulses does not depend on the speed of rotation. This circuit arrangement is also suitable for detecting the speed of rotation and the direction of rotation of asynchronous motors which are operated in a star or a delta circuit.

The frequency of detection of the speed of rotation of the asynchronous motor 2 depends on the relevant standards or safety requirements. Such a test cycle may be effected for example once per hour.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined in the appended claims.

We claim:

1. An apparatus having an automatic firing arrangement for actuating a fan, comprising:

said fan, a controllable-speed asynchronous motor connected to and driving said fan, a frequency converter connected to and receiving power from an external source, connected to said asynchronous motor and controlling the speed of rotation of said asynchronous motor, a switching device connected at the output of said frequency converter, said switching device temporarily disconnecting said frequency converter from said asynchronous motor for a predetermined period of time, a measuring circuit connected across at least one winding of said motor, said measuring circuit receiving an output signal from said motor winding during said predetermined period of time of disconnecting said converter from said motor, a programmer connected to said converter and said switching device, said programmer outputting a control signal from said programmer to said converter and said switching device, said programmer also connected to said measuring circuit and receiving at least one input signal from said measuring circuit, wherein when said programmer causes said switching device to disconnect said converter from said motor, the continuing rotation of said motor generates a Faraday-effect electric field across said motor winding, wherein said electric field causes a voltage signal to be outputted from said winding into said measuring circuit, said measuring circuit then processing said voltage input signal and deriving therefrom an output signal for transmission to said programmer, and wherein said programmer receives said output signal from said measuring circuit and determines therefrom the speed and direction of rotation of said motor.

2. The apparatus of claim 1 wherein said measuring circuit has two inputs which are connected to two terminals of said asynchronous motor, wherein said measuring circuit converts said voltage signal applied between its inputs into a sequence of rectangular pulses, and transmits said pulses to said programmer, and wherein said programmer determines said speed of rotation of said asynchronous motor from the timing configuration of said pulses.

3. The apparatus of claim 2 wherein said programmer tests said output signal of said measuring circuit to ascertain whether the spacing between said rectangular pulses increases with an increasing time period of opening of said switching devices.

4. The apparatus of claim 1 wherein said measuring circuit has three measuring units, each with two inputs which are respectively connected to two terminals of said asynchronous motor, each of said measuring units being operable to convert the voltage signal applied at its input into a corresponding output signal in the form of rectangular pulses, and to transmit same to said programmer, and wherein said programmer determines the speed and direction of rotation of said asynchronous motor from said three measuring unit output signals.

5. The apparatus of claim 4 wherein said three measuring units each have a monostable, single-edge-triggered trigger circuit adjusted so that the durations of said rectangular pulses of said three output signals are of different lengths, wherein said three output signals are combined by means of a circuit element to give a sum signal which is transmitted to said programmer, and wherein said programmer determines therefrom the speed and direction of rotation of said asynchronous motor.

6. The apparatus of claim 4 wherein said programmer tests said output signal of said measuring circuit to ascertain whether the spacing between said rectangular pulses increases with an increasing time period of opening said switching devices.

7. The apparatus of claim 1 wherein at certain moments in time said programmer performs a test cycle for determining the speed and direction of rotation of said asynchronous motor.

8. The apparatus of claim 1 wherein said programmer, prior to said apparatus being brought into continuous operation, performs a measuring cycle in which the deceleration of the speed of rotation of said asynchronous motor at different speeds of rotation is detected and values thereof are stored in a table, and wherein, at given moments in time during continuous operation of said apparatus, said programmer detects the speed of rotation and the deceleration of said asynchronous motor and compares same to said values stored in said table.

* * * * *